(12) United States Patent
Nestler

(10) Patent No.: US 6,726,404 B2
(45) Date of Patent: Apr. 27, 2004

(54) DEVICE AND METHOD FOR SIMULATING NATURAL CUES SO THAT WATERBORNE FAUNA AVOID CONTACTING MANMADE BARRIERS

(75) Inventor: John M. Nestler, Vicksburg, MS (US)

(73) Assignee: The United States of America as represented by the Secretary of the Army, Washington, DC (US)

( * ) Notice: Subject to any disclaimer, the term of this patent is extended or adjusted under 35 U.S.C. 154(b) by 0 days.

(21) Appl. No.: 10/226,555

(22) Filed: Aug. 20, 2002

(65) Prior Publication Data
US 2003/0021632 A1 Jan. 30, 2003

(51) Int. Cl.⁷ .............................. E02B 8/08; E02B 3/00
(52) U.S. Cl. ............................ 405/81; 405/80; 119/219
(58) Field of Search .............................. 405/80, 81, 82, 405/83; 119/219, 220

(56) References Cited

U.S. PATENT DOCUMENTS

| 2,826,897 | A | * | 3/1958 | Vinsonhaler et al. ......... 405/81 |
| 3,338,056 | A | | 8/1967 | Roscoe |
| 4,437,431 | A | | 3/1984 | Koch |
| 4,481,904 | A | | 11/1984 | Fletcher |
| 4,488,835 | A | * | 12/1984 | Eicher .......................... 405/83 |
| 4,526,494 | A | | 7/1985 | Eicher |
| 4,676,893 | A | * | 6/1987 | Travade et al. ............. 119/219 |
| 4,740,105 | A | | 4/1988 | Wollander |
| 4,929,122 | A | | 5/1990 | Yoas |
| 5,263,833 | A | | 11/1993 | Robinson et al. |
| 5,385,428 | A | | 1/1995 | Taft et al. |
| 5,445,111 | A | | 8/1995 | Smith |
| 5,558,462 | A | | 9/1996 | O'Haver |
| 6,038,494 | A | | 3/2000 | Fisher et al. |
| 6,102,619 | A | | 8/2000 | Truebe et al. |
| 6,155,746 | A | | 12/2000 | Peters |
| 6,160,759 | A | | 12/2000 | Nestler et al. |
| 6,273,639 | B1 | | 8/2001 | Eikrem et al. |
| 6,347,908 | B1 | * | 2/2002 | Safwat ........................ 405/81 |
| 6,457,436 | B1 | * | 10/2002 | Truebe et al. ............... 119/219 |
| 6,467,997 | B2 | * | 10/2002 | Johnson ........................ 405/81 |
| 6,524,028 | B2 | * | 2/2003 | Bryan .......................... 405/81 |

FOREIGN PATENT DOCUMENTS

| GB | 2241857 | * | 9/1991 | .................. 119/219 |
| JP | 61053909 | * | 3/1986 | .................. 405/80 |

* cited by examiner

Primary Examiner—Jong-Suk Lee
(74) Attorney, Agent, or Firm—Earl H. Baugher, Jr.

(57) ABSTRACT

Provided are a device and associated method for simulating natural hydraulic cues received instinctively by waterborne fauna. A preferred embodiment is suitable for modifying existing manmade barriers such as fish diversion screens used at dams. The simulated cues mimic those produced by the flow of water over rough streambeds. Fish detect the cues and avoid contact with the barriers in the same way that they avoid collision with natural features. In one embodiment, a series of rectangular plates are attached to the U-clip connectors on the downstream side of diversion screens. The plates are oriented approximately perpendicular to the flow lines approaching the surface of the screen. The flow contacts the plates and, because the orientation of the plate creates an unstable hydraulic field, the flow alternately slips above and below the plates, creating fluctuating local acceleration zones able to be detected by migrating fish and other waterborne fauna.

8 Claims, 8 Drawing Sheets

DEVICE AND METHOD FOR SIMULATING NATURAL CUES SO THAT WATERBORNE FAUNA AVOID CONTACTING MANMADE BARRIERS

STATEMENT OF GOVERNMENT INTEREST

Under paragraph 1(a) of Executive Order 10096, the conditions under which this invention was made entitle the Government of the United States, as represented by the Secretary of the Army, to the entire right, title and interest in any patent granted thereon by the United States. This and related patents are available for licensing. Please contact Bea Shahin at 217 373-7234 or Phillip Stewart at 601 634-4113.

FIELD OF THE INVENTION

The field is that hydraulic engineering needed to guide, regulate, and modify fluid flow. In particular, a preferred embodiment of the present invention assists waterborne fauna, such as fish, in avoiding contact with a manmade obstruction.

BACKGROUND

Water resources development typically includes the construction of dams across rivers to impound and regulate flows for power production, flood control, water supply, irrigation and other economically beneficial uses of water. In many rivers, adult fish typically migrate upstream through the river to spawn and rear in upstream areas. Once young, or juvenile, fish reach a certain size they instinctively migrate downstream to the adult habitat areas in downstream reaches of the river, in lakes, or in the ocean where they mature into adults and complete their life cycle. Juvenile salmon and many other juvenile fishes are spawned in upstream fresh water systems where early life stages are completed but reach adulthood in downstream areas.

Unfortunately, dams block the migration of fish and thereby interfere with the completion of their natural life cycles. Sustainable water resources development is often facilitated by the use of hydraulic structures to pass these juvenile fish around the dam and other channel obstructions.

Systems and methods for assisting fish in circumventing man-made barriers in streams have been tried for many years, e.g., U.S. Pat. No. 3,338,056, Fingerling Saving System, issued to Roscoe, Aug. 29, 1967, details a complex arrangement of recesses using vertically oriented entrances for permitting the transport of fingerlings around a dam. Quoting from the '056 patent: "The difficulty (of getting fingerlings downstream) arises due to the tendency of the fingerlings to follow flowing currents of water, and ordinarily such flowing currents go through the turbines of the associated power station. The fingerlings suffer high mortality in passing through the turbines. . . ."

A later patent, U.S. Pat. No. 4,437,431, Method and Apparatus of Diversion of Downstream Migrating Anadromous Fish, issued to Koch, Mar. 20, 1984, uses an "artificial stream" generated by water jets within the natural stream together with long tubes having funnel-shaped entrances located on the sides of the stream at some distance from the upstream side of the dam. Another solution that offers an "attracting" artificial current based on an active source include a propeller generated current as described in U.S. Pat. No. 6,102,619, Flow Inducer Fish Guide and Method of Using Same, issued to Truebe et al., Aug. 15, 2000. A related technique involving a series of opening and closing valves, fish passing actuators and conduits is detailed in U.S. Pat. No. 6,273,639 B1, Method and Apparatus for Facilitating Migration of Fish Past Dams and Other Barriers in Waterways, issued to Eikrem et al., Aug. 14, 2001.

To comply with government regulations, other solutions have involved configurations of barrier screens and bypass conduits such as that envisioned by U.S. Pat. No. 4,481,904, Fish Conservation Device, issued to Fletcher, Nov. 13, 1984; U.S. Pat. No. 4,526,494, Penstock Fish Diversion System, issued to Eicher, Jul. 2, 1985; and U.S. Pat. No. 4,740,105, issued to Wollander, Apr. 26, 1988. One such screen barrier uses a number of like modules in a ladder arrangement affixed to the bottom of the channel as described in U.S. Pat. No. 4,929,122, Fish Protection System for Dams, issued to Yoas, May 29, 1990. An underwater "screen house" located adjacent a dam is described in U.S. Pat. No. 5,385,428, Water Intake Fish Diversion Apparatus, issued to Taft et al., Jan. 31, 1995. A buoyant screen that may be sunk and raised at appropriate fish migrations times is described in U.S. Pat. No. 5,558,462, Flat Plate Fish Screen System, issued to O'Haver, Sep. 24, 1996.

Still other solutions provide for a buoyant arrangement of vertically oriented slats located some distance upstream from a barrier such as described in U.S. Pat. No. 5,263,833, Fish Guiding Assembly and Method Utilizing Same, issued to Robinson et al., Nov. 23, 1993. This arrangement, and others like it, consumes a considerable amount of the surface area immediately upstream from the dam.

Active solutions are also proposed as exemplified in U.S. Pat. No. 5,445,111, Electrified Fish Barriers, issued to Smith, Aug. 29, 1995, describing linear curtain arrays characterized by pulsed driving signals that may use varying voltages. Other active solutions include complex electronic detectors and control systems to alter the operation of a hydroelectric powerhouse in the presence of migrating fish as described in U.S. Pat. No. 6,038,494, Control System for Enhancing Fish Survivability in a Hydroelectric Power Generation Installation, issued to Fisher et al., Mar. 14, 2000.

Fish ladders have been used to help returning anadromous fish get to spawning beds and are also proposed to help the juveniles return to the sea as described in U.S. Pat. No. 6,155,746, Fish Ladder and Its Construction, to Peters, Dec. 5, 2000. This details a complex series of basins having vertical inflow and outflow slots for transporting fish around a barrier.

The above solutions involve a configuration that is either much more complex and costly than a preferred embodiment of the present invention, uses much more "geography" to effect the desired result, uses energy or large quantities of water to effect the desired result, is unable to be used to modify an existing barrier, or a combination of these undesirable factors.

Juvenile outmigrating fish instinctively seek passage through the dam when their downstream journey is blocked. For a detailed discussion, refer to U.S. Pat. No. 6,160,759, Method for Determining Probable Response of Aquatic Species to Selected Components of Water Flow Fields, issued to Nestler et al., Dec. 12, 2000, and incorporated herein by reference. In the Columbia River, conventional surface bypass collectors (SBC's) are a preferred passage design used at dams for passing outmigrating juvenile fish.

A conventional SBC employs a water intake plume to attract fish to its entrance. Using conventional engineering concepts, the SBC's attract and concentrate fish for conveyance around the dam in a manner that helps prevent their entry into turbines or other high-energy hydraulic conditions where they may be injured or killed. An SBC uses an attracting intake plume of sufficient flow magnitude to overcome the attracting flow of competing inflows such as are present at hydroturbines, sluicegates or spillways. Once juvenile fish enter the SBC they are conveyed to a bypass channel where they continue the migration downstream of the dam. Design of the entrance hydraulic conditions used in conventional SBCs does not incorporate knowledge of the behavior of the juvenile fish in natural streams and rivers. As a consequence, the performance of conventional SBCs varies, with some working well and others not. Poor performance most commonly results from uncertainty about the flow conditions required to attract juvenile fish to the entrance of the SBC. A preferred embodiment of the present invention provides a method that employs natural hydraulic cues.

Refer to FIGS. 1, 2, and 3. To protect fishes that are not intercepted by an SBC, or if an SBC is not available, the present state-of-the-art for fish protection uses diversion screens 206, 300 such as ones shown in FIGS. 2 and 3, to intercept fish and prevent them from entering intakes of turbines or diversion canals. For example, FIG. 1 illustrates typical structures commonly encountered by fish as they attempt to move from the forebay on the upstream side of a dam to downstream river reaches. The dam depicted consists of a powerhouse 101 and a spillway 102 with water flow indicated by arrows 103. Once the water passes the dam, it and its contents are dumped into the tailrace 104.

FIG. 2 shows design features (through cut 1–1 of FIG. 1) of a conventional system used to intercept outmigrating fish. A portion of the flow 103 and surface oriented fish pass through a trash rack 203 and some fish are intercepted by the diversion screen 206 and guided up into a gatewell 202. A barrier screen 201 returns the majority of the flow back into the turbine 204 for subsequent discharge through the draft tube 205 and concentrates the diverted fish in the gatewell 202. From the gatewell 202, outmigrating fish are collected using several different means and conveyed around the dam.

Refer to FIG. 3. There are three primary design criteria for diversion screens 300. The first is hydraulic efficiency, i.e., screens 300 should be designed to minimize energy loss across their surface, thereby maximizing energy potential for associated hydropower facilities. Second, screens 300 should be designed so that approach water velocity 103 is low enough so that fish do not impact the screen 300 at damaging velocities. The approach velocity 103 is partially controlled by a perforated plate 302 that is installed behind (downstream) of the screen surface 301. The size and spacing of the perforations 306 on the plate 302 may be adjusted to vary the water velocity approaching the screen surface 301. Third, the wires or bars 304 that constitute the screen surface area are spaced 303 so that fish of a certain minimum size are blocked by the screen 300 and physically prevented from passing through the screen 300. The flow pattern approaching the screen surface 301 is determined by the following characteristics of the system: discharge passing into the intake; the size and shape of the intake; the angle of deployment of the screen 300; the size, shape, and spacing of the bars 304 or wires that comprise the screen surface 301; the size, shape and location of structural members 304, 305 that make up the screen 300 frame; and the size and spacing of the perforations 306 in the back plate 302.

The design criteria for minimizing head loss can have significant effects on fish that approach the screen surface 301. Refer to FIG. 4. A byproduct of increased screen efficiency is that less of the energy of the water passing through the screen 300 is available to generate secondary hydraulic cues that fish can use to detect and avoid the screen surface 301. Therefore, as hydraulic efficiency increases the screen 300 becomes more hydrodynamically transparent so that fish become more likely to contact the screen surface 301 where they may be injured or killed. In response, the perforation plate 302 must be redesigned or other steps must be taken to decrease approach velocities 103.

A need, therefore, exists for an optimum method of guiding migrating fish, in particular juvenile fish, in a way that minimizes the propensity of fish to impact diversion screens. A further need exists to modify existing barriers to reduce the cost of implementing the optimum method.

SUMMARY

A structure and method of adding natural hydrodynamic cues to manmade barriers in waterways is provided. It simulates those cues produced by the flow of water over rough streambeds. Fauna, such as fish, detect the cues and avoid high velocity impact on the barrier surface in the same way that they avoid collision with natural, solid features of the streambed.

The method that thus assists waterborne fauna adds at least one feature to existing barriers (or conventional barrier designs) that enables simulation of natural hydraulic cues of which fauna are receptive. The simulated cue initiates an instinctive awareness in the fauna, e.g., migrating juvenile fish, to detect and thereby avoid barriers such as fish diversion screens at a dam. The absence of such a feature may result in the fauna contacting barriers at harmful velocities.

For conventional fish diversion screens, adding a feature comprises affixing rows of elements to the downstream side of the diversion screens. The elements, such as rectangular plates are arranged with a longest dimension approximately perpendicular to the longest dimension of the material that comprises the diversion screens, e.g., wire or bars. The plates are affixed to the diversion screens across their thickness in spacing and dimension by using standard engineering methods that may also accommodate requirements not related to simulating the natural hydraulic cue. A convenient location for affixing the plates on conventional diversion screens is at the U-clips that both locate (space) and connect the wires or bars used to construct the planar diversion screen.

The diversion screen that results from incorporating a preferred embodiment of the present invention in a conventional design generates a natural hydraulic cue that permits fauna to avoid contact with the screen. It may be built from material such as parallel wires or bars that are much longer in one dimension than in any other dimension, and much smaller in its smallest dimension than in any other dimension, such as a thin rectangular plate. A series of connectors, such as U-clips, connect the existing elements of a conventional diversion screen in parallel, in accordance with a pre-specified spacing assigned between the smallest dimension (thickness) of each element. This yields a planar structure, i.e., a screen, with a minimum pre-specified spacing between any two elements. So far a conventional diversion screen has been described. A second series of parallel elements, such as rectangular plates, is affixed on the downstream side of the planar structure proximate the connectors (U-clips in some designs). Orienting these rectangular plates approximately perpendicular to the longest dimension of the bars or wires of the screen, affixed on edge to the conventional diversion screen, enables a natural cue to be generated by the heretofore conventional screen design in the sense that the resulting upwelling resembles water flowing over a rock or other channel feature.

Conveniently, existing barriers or screens may be modified using a preferred embodiment of the present invention. Affixing a configuration in accordance with the present invention enables a diversion screen to generate a natural cue for receipt by fauna otherwise susceptible to harmful impact on barriers such as fish diversion screens. The configuration is attached to a downstream side of a barrier or diversion screen in such a manner that the resultant Natural Cue Diversion Screen (NCDS) creates localized, dynamic hydraulic features simulating those features that fauna use to instinctively avoid natural barriers in waterways. A proper distribution of elements, such as rectangular plates, on the downstream side of the diversion screen provides a pattern of natural hydraulic cues across the entire surface of the diversion screen. The plates may also replace a perforated back plate of a conventional design, thus performing double duty by reducing the flow of water through a surface of the diversion screen to a predetermined quantity.

A preferred embodiment of the present invention provides a design that enables the generation of natural hydraulic cues. In one embodiment, modifying existing conventional fish diversion screens, the modification adds a series of rectangular plates attached to U-clips. These U-clips are welded on the bottoms of the bars or wire of the conventional screen for structural support and spacing of the individual bars that are the basic elements of the screen. The plates are oriented so that they are approximately perpendicular to the flow lines approaching and passing through the screen surface. A portion of the flow collides with the plates to create locally unstable hydraulic features that chaotically slip above and below the plates. This chaotic hydrodynamic oscillation extends above the screen surface and can be detected by fish prior to a possible relatively high velocity contact with the screen surface. Fish are thereby guided by the signals generated by the modified screen thus reducing unheralded collisions with the screen surface or supporting structure.

DETAILED DESCRIPTION

Outmigrating juvenile salmon and fish of other species make use of hydraulic cues to navigate their way through the complex flow fields of natural waterways, particularly in muddy water or at night. Many juvenile fishes migrate at night when vision is diminished.

Figure 5:
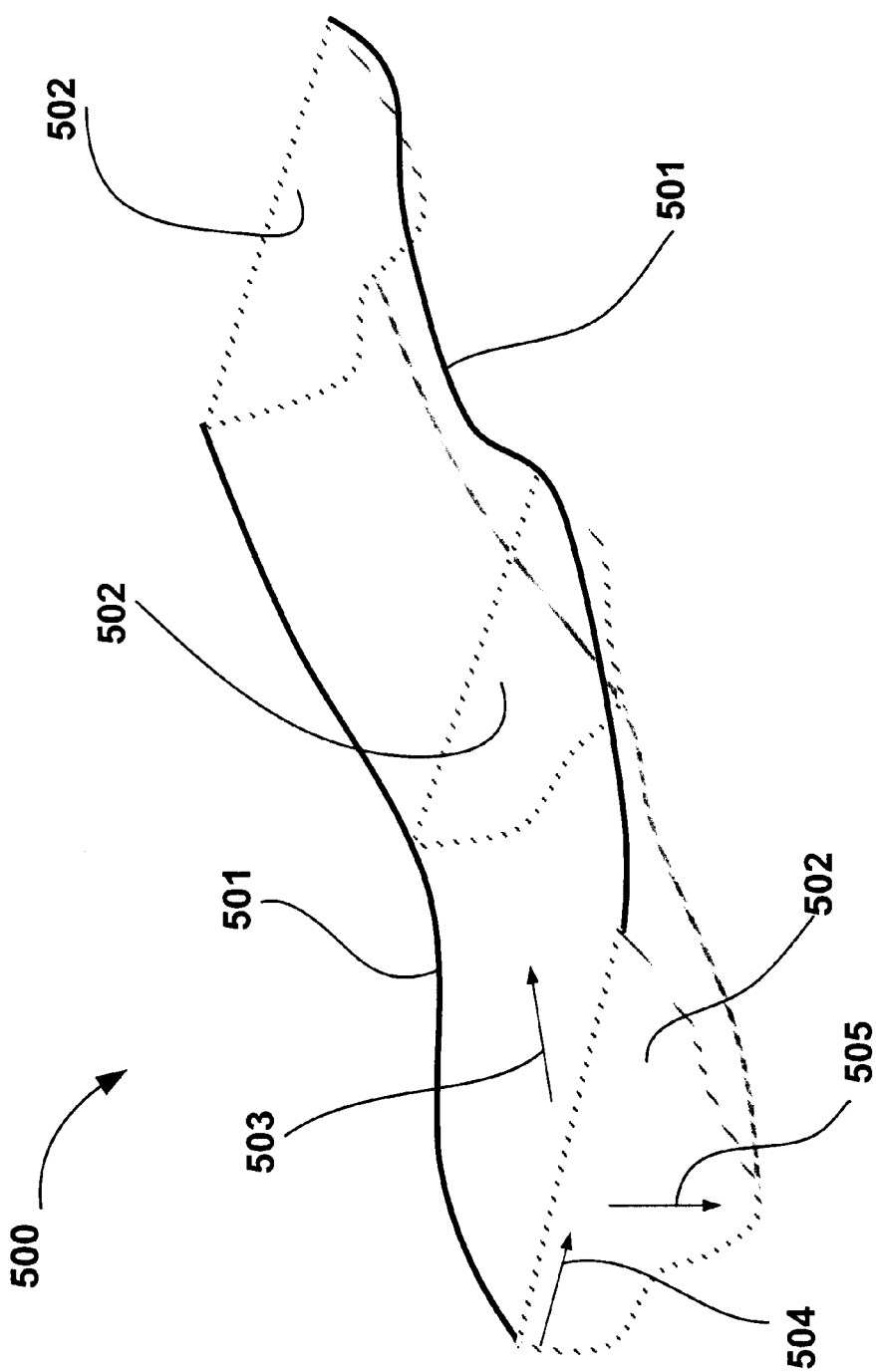
FIG. 5 is a schematic representation of natural stream cross sections incorporating velocity vectors in three dimensions.

Refer to FIG. 5. By convention, the x-direction velocity vector, u 503, is parallel to the long axis of the stream channel 500, the y-direction velocity vector, v 504, is perpendicular to u 503 and extends from one shore 501 to the other, and the z-direction vector, w 505, is perpendicular to both u 503 and v 504 and represents velocity with respect to depth (or elevation) within the stream channel 500.

Figure 6:
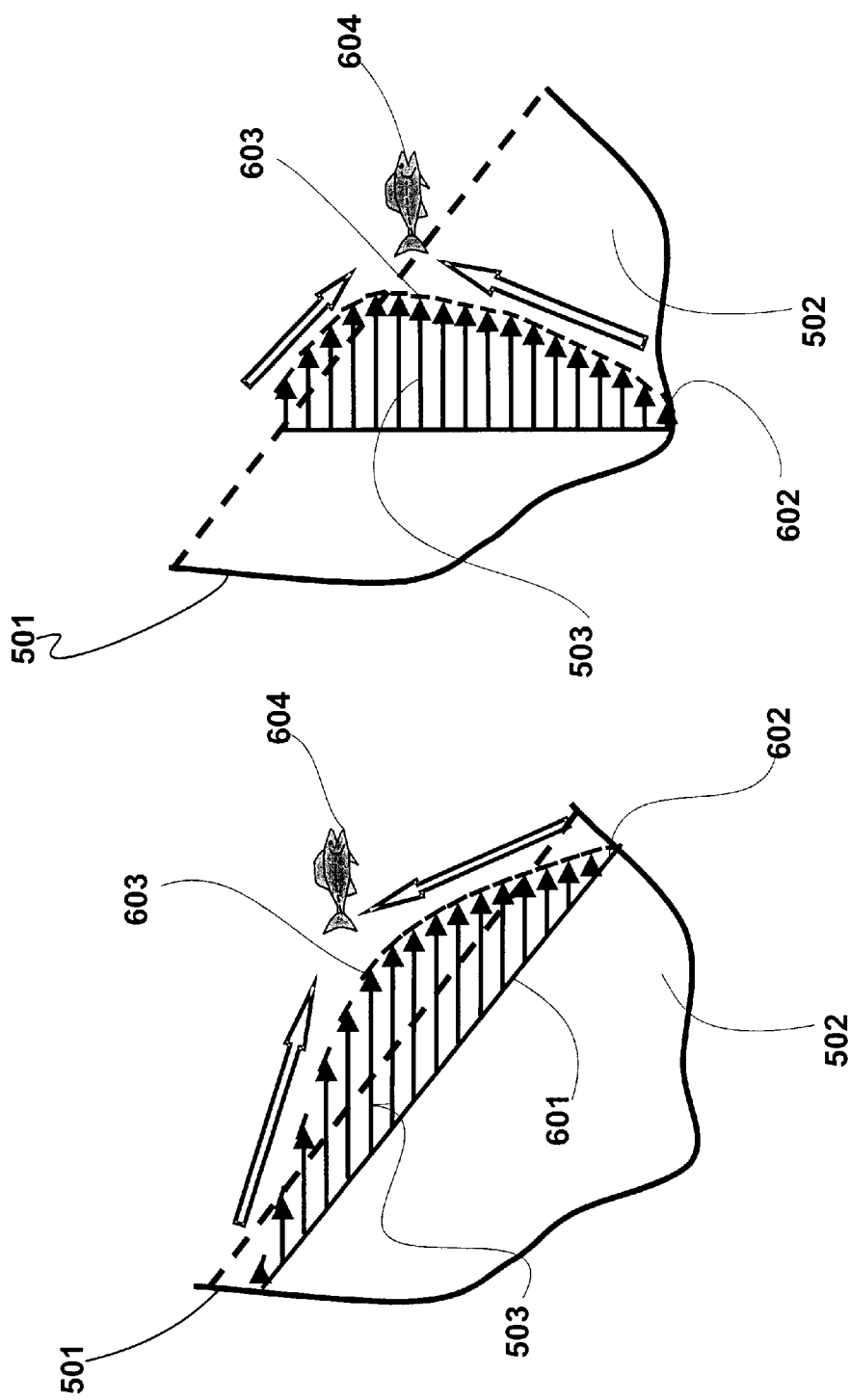
FIG. 6 depicts vectors representing stream flow in a natural streambed in both the horizontal and vertical planes with respect to stream flow.

Refer to FIG. 6. Shown are the x-direction vectors, u 503, with respect to the sides 501 of the channel 500 and also with respect to the top and bottom of the channel 500 and the respective boundaries 602 in each orientation. For example, u 503 at a particular depth 601 is depicted in the cross section on the left and u 503 is depicted near the center of the channel 500 over the entire depth of the channel 500 in the cross section on the right. In natural waterways, water velocities at boundaries 602 are essentially zero and increase away from the boundaries 602 (e.g., where the water comes in contact with the stream bottom or sides) to a maximum value 603 equidistant from the friction effects of the boundaries 602 (after the effect of the boundaries 602 has been corrected for differential roughness). The rate of change in u 503 laterally ($\Delta u/\Delta y$), or with depth ($\Delta u/\Delta z$), has its greatest absolute values near the boundaries 602 and its smallest values at the belly of the velocity profiles 603. In addition to being the zone of maximum mean water velocity, this zone is also the zone where the change in u velocities in either the z- or y-directions is essentially zero, or in mathematical terms, $\Delta u/\Delta y=0$ and $\Delta u/\Delta z=0$. A fish swim path selection behavior that minimizes the absolute value of $\Delta u/\Delta y$ and $\Delta u/\Delta z$ will allow a fish 604 to find and maintain its position in this critical zone of optimal migration efficiency in natural waterways.

Refer to FIGS. 5 and 6. The natural flow fields of streams under steady-state conditions, i.e., not varying with time, can be represented as velocity vectors u 503, v 504, and w 505. The acceleration terms, $a_u$, $a_v$, and $a_w$, representing the acceleration associated with the u 503, v 504, and w 505 velocity vectors, may also play a role. In natural waterways, u 503, v 504 and w 505 water velocities at boundaries 602 such as the sides, top and bottom of the channel 500 are essentially zero because of friction and increase away from the boundaries 602 to a local maximum 603 approximately equidistant from the friction effects of the boundaries 602. This zone is of critical importance to migrating fish because it represents, on average, the greatest velocity in the cross section 502 and the swim pathway to the ocean that requires the least expenditure of energy by outmigrating fish 604. In addition to minimizing swimming effort to the ocean, this zone maximizes the size of the sensory envelope within which fish 604 are able to detect and avoid predators, and maximizes their ability to detect and orient to hydraulic cues. Fish 604 that can find this zone are able to utilize the optimum pathway through complex stream or waterway channels 500 to their adult habitat.

Refer to FIG. 6. The rate of change in velocity vectors is embodied in the hydraulic strain rate or tensor variables, primarily $\Delta v/\Delta x$, $\Delta w/\Delta x$, $\Delta v/\Delta z$, $\Delta a_v/\Delta x$, $\Delta a_w/\Delta x$, $\Delta a_u/\Delta y$, $\Delta a_w/\Delta y$, $\Delta a_u/\Delta z$, and $\Delta a_v/\Delta z$. For example, u 503 velocities in the y-direction ($\Delta u/\Delta y$) or u 503 velocities in the z-direction ($\Delta u/\Delta z$), have their greatest absolute values near the boundaries 602 and their smallest values at the belly 603 of the velocity profiles. Outmigrating juvenile fish 604 have evolved a sensory system that cues into this natural velocity pattern to find the optimum pathway through the waterway. That is, outmigrating fish select the swim path through the waterway that minimizes the absolute value of the tensor variables in the flow field. In particular, they probably minimize the absolute value of $\Delta u/\Delta y$ and $\Delta u/\Delta z$, and by so doing are able to locate themselves in the deepest part of the channel 500 about equidistant from both shores 501. In addition to being the zone of maximum mean water velocity, this zone is also the zone where the change in u velocities in either the z- or y-directions is essentially zero, or in mathematical terms, where $\Delta u/\Delta y=0$ and $\Delta u/\Delta z=0$. A fish swim path selection behavior that minimizes the absolute value of $\Delta u/\Delta y$ and $\Delta u/\Delta z$ will allow a fish to find and maintain its position in this critical zone of optimal migration efficiency in natural waterways.

Figure 1:
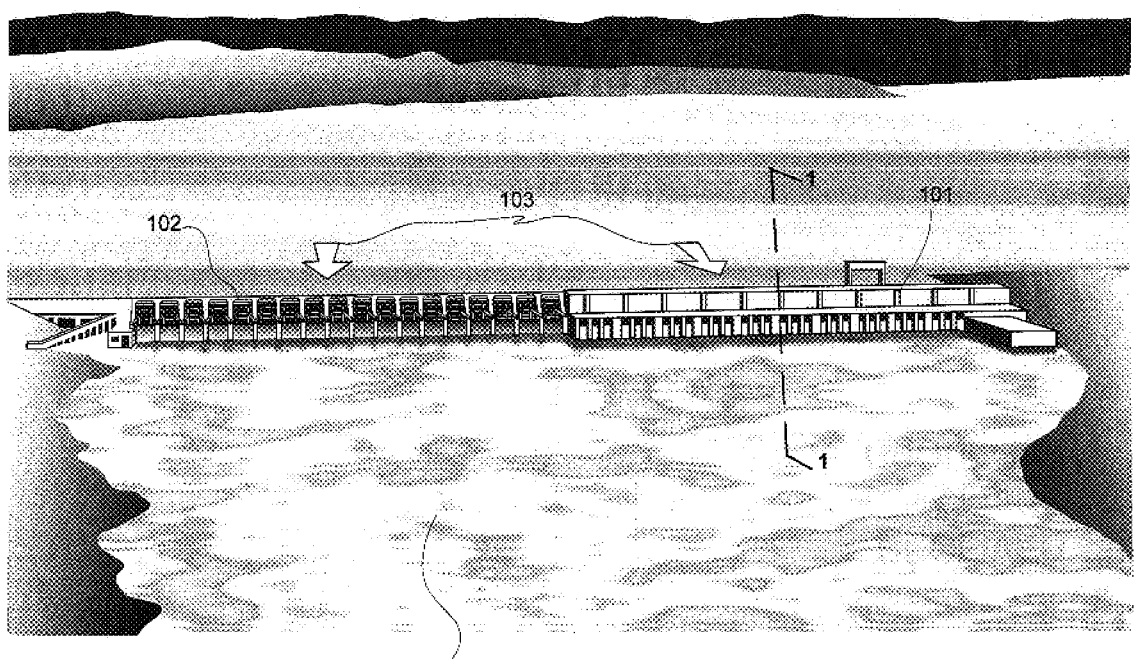
FIG. 1 depicts a dam having both a powerhouse and a spillway that may use a prior art fish diversion screen.
Figure 2:
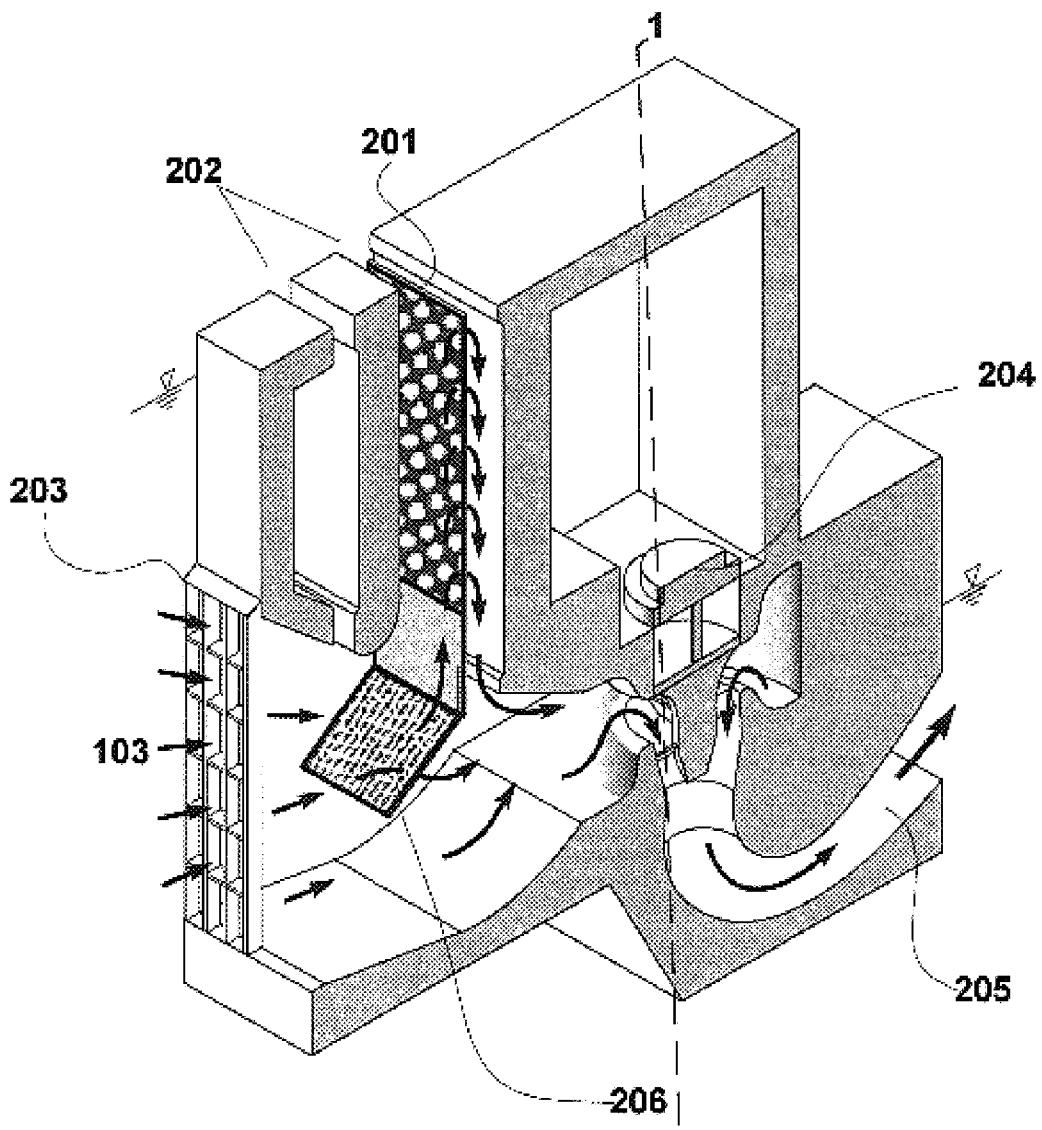
FIG. 2 shows prior art means incorporated in the powerhouses of the dam of FIG. 1 for diverting fish migrating downstream.
Figure 3:
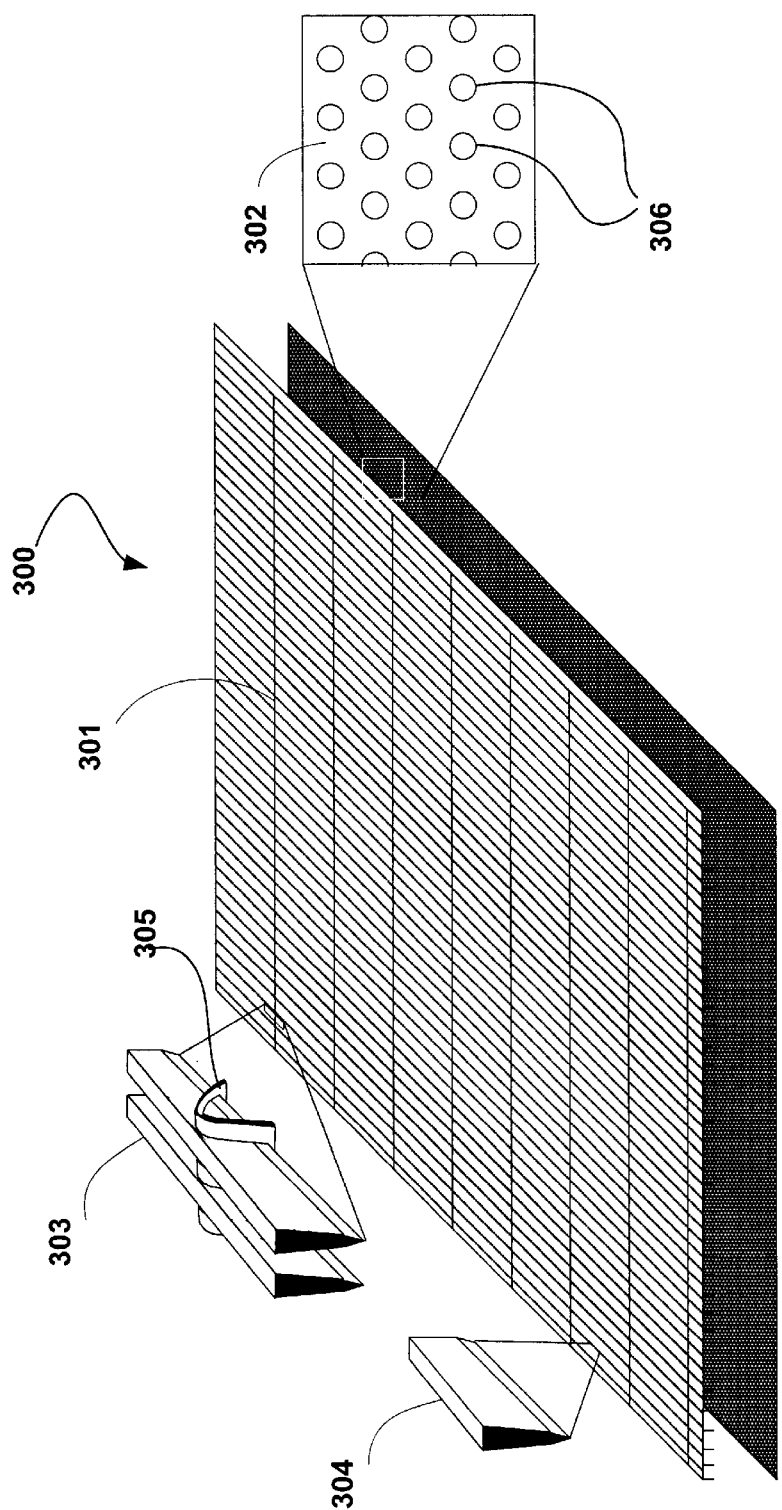
FIG. 3 is an isometric view from the surface of a prior art bypass screen showing the individual wedge wires or bars that form the surface of the screen as well as a perforated screen that may be used also.
Figure 8:
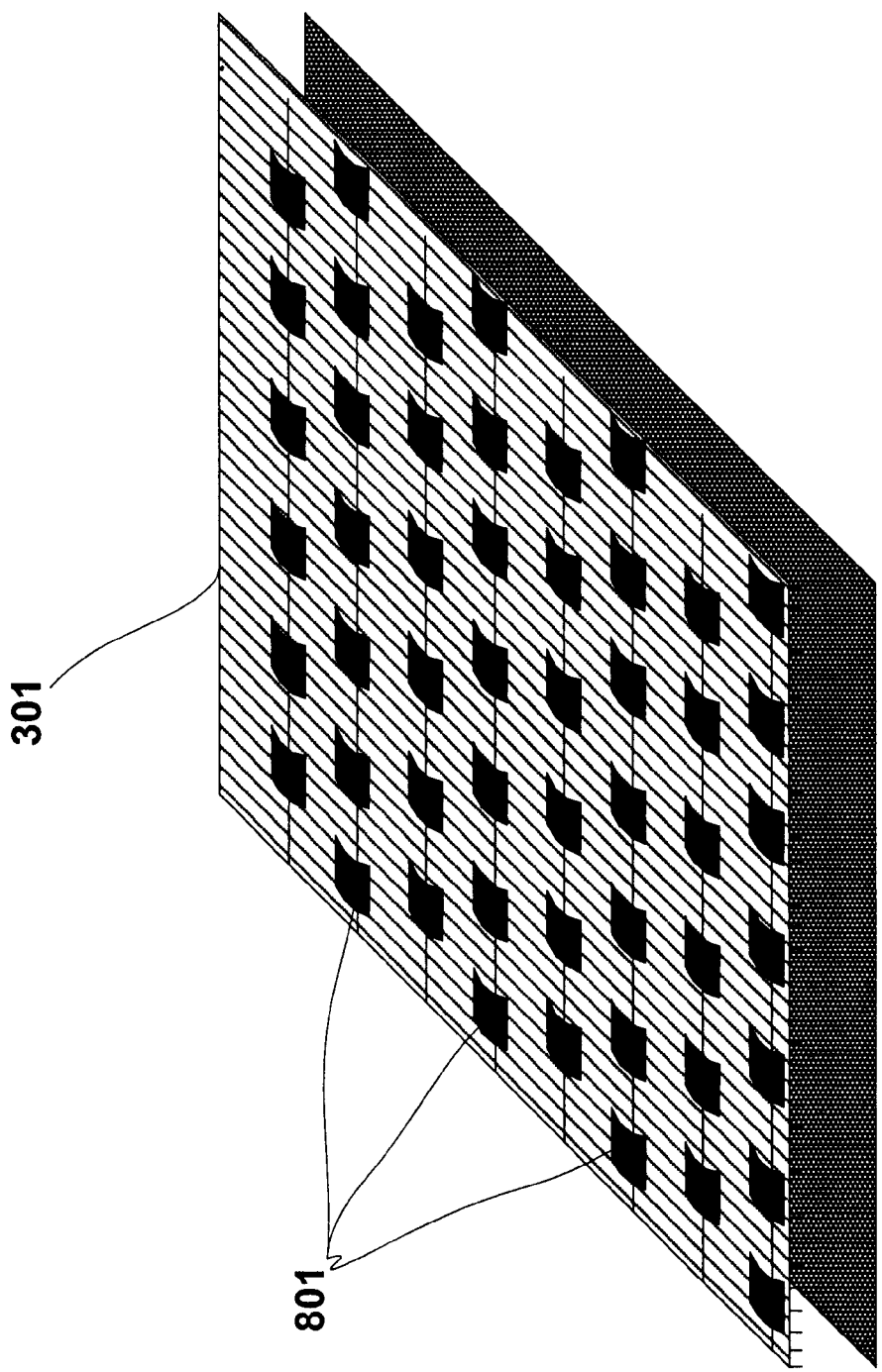
FIG. 8 is a schematic, idealized representation of disruptions in a flow pattern across a screen surface of a preferred embodiment of the present invention.

Refer to FIG. 3. A diversion screen 300 that is hydraulically efficient will have a minimal effect on the flow field. Therefore, a migrating fish 604 approaching the screen surface 301 will conclude that the optimum migratory pathway to the ocean passes through the screen surface 301. Thus, migrating fish 604 may be unable to detect the presence of the screen 300 and are likely to collide with it. The innovative design for a preferred embodiment of the present invention, the Natural Cue Diversion Screen (NCDS), capitalizes on the ability of juvenile fish 604 to respond to the strain rate variables to keep from colliding with rocks and similar features of the solid boundaries 602 of the waterway channel 500. Refer to FIGS. 3 and 8. The NCDS incorporates specific design features that create small-scale hydrodynamic disturbances or signals (black areas) 801 above the screen surface 301 that signal the presence of the screen surface 301. The signals allow the fish 604 to detect the screen surface 301 prior to colliding with it. Fish 604 are then guided by the hydrodynamic signals 801 generated by the screen 300 as opposed to being "guided" by the physical structure of the screen 300 itself.

Figure 4:
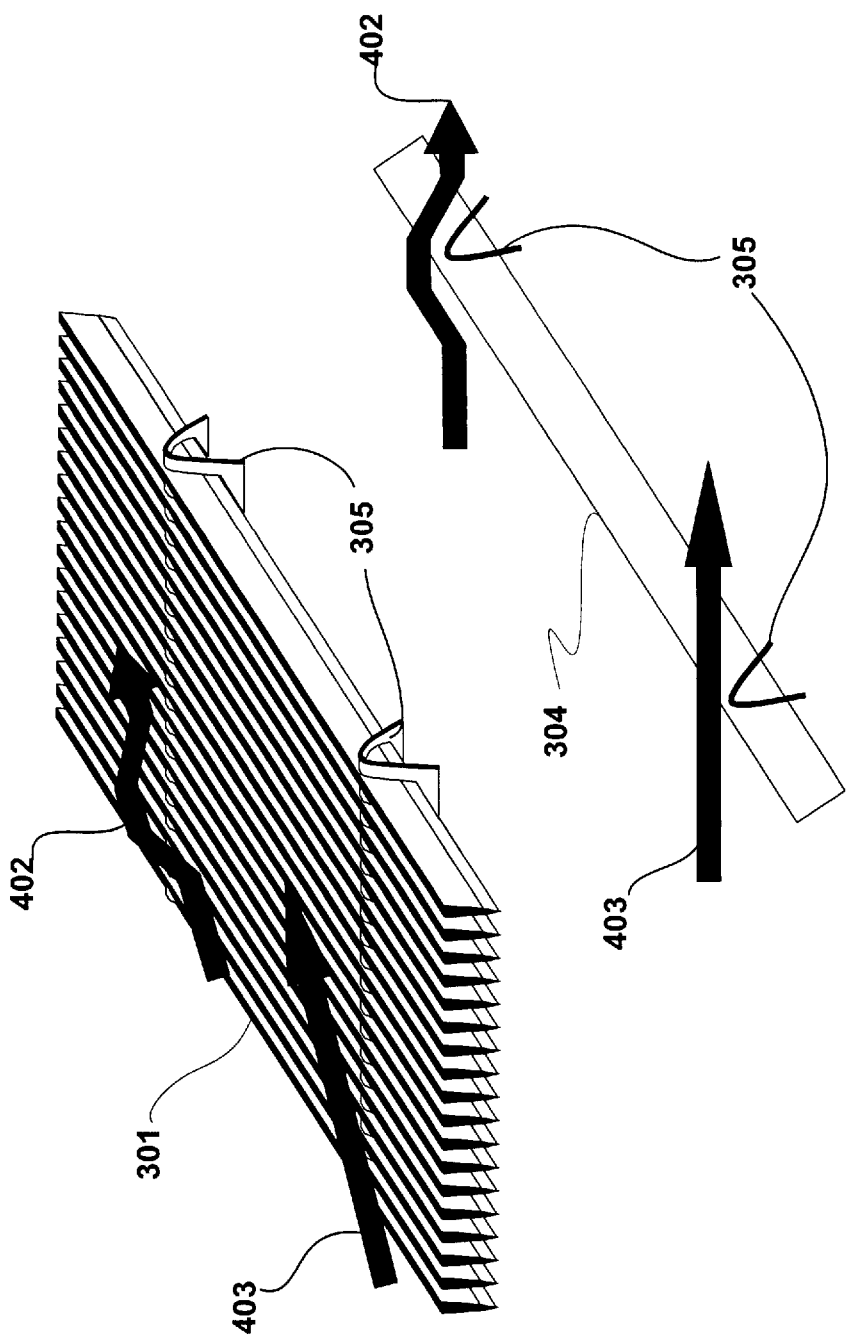
FIG. 4 depicts isometric and side views of streamlines created by the structure of a prior art screen.

Refer to FIG. 3. In conventional screens, U-clips 305 are grooved and each individual wedge wire or bar 304 is inserted into the U-clip 305 and welded into place. Refer to FIG. 4. The direction and speed of flow 403 passing through the screen surface 301 between the U-clips 305 is little impacted as indicated at 402 by the presence of the screen 300. The direction of flow 402 approaching at the U-clips 305 is slightly re-directed away from the screen 300 before re-directing back into the screen surface 301.

Figure 7:
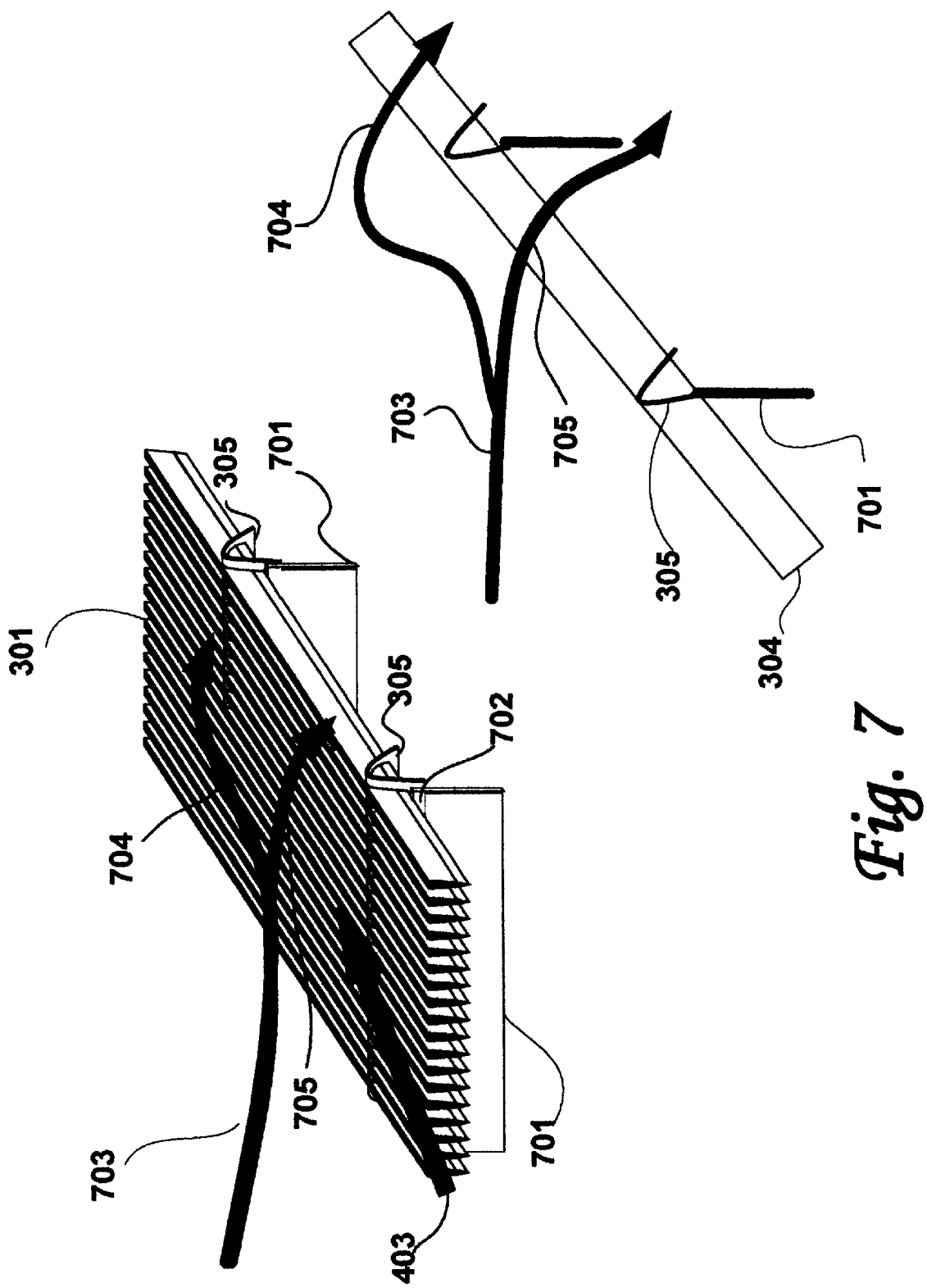
FIG. 7 depicts isometric and side views of stream lines passing through a screen with rectangular plates attached to one of the legs of the U-clips in accordance with a preferred embodiment of the present invention.

Refer to FIGS. 7 and 8. Short sections of rectangular plates 701 are attached on the downstream side of the screen 300 (underneath as shown in FIG. 7) and generate unsteady features on the screen surface 301 that are maximally sized and depicted as the black objects 801 on the screen surface 301. The features of the black objects 801 are drawn as if they are all of the same size and exist as steady state features. In reality, all of the black objects 801 are chaotically fluctuating in size and duration to create a hydrodynamic pattern on the screen surface 301 that signals the presence of the screen 300 to approaching animal life, in particular juvenile fish 604. This is the natural hydraulic cue now being simulated by the screen 300 as modified in accordance with aspects of a preferred embodiment of the present invention. Note that the streamlines 703 are significantly re-directed by the rectangular plates 701. Although drawn as a stable, steady family of stream lines 703, the actual stream lines are changing as the flow 703 alternates chaotically between passing above 704 and below 705 the rectangular plate 701.

Thus, in one embodiment, the design feature added to a conventional fish diversion screen 300 that signals the presence of the screen surface 301 to animal life, including juvenile fish 604 consists of a series of evenly-spaced rectangular plates 701 that are attached via a weld 702 or similar mechanism to the slotted U-clips 305 that determine the spacing between the individual wedge wires or bars 303. The rectangular plates 701 are oriented so that they are approximately perpendicular to the flow lines 703 approaching the screen surface 301, thus creating a local instability in the flow field. This instability is characterized by the local flow randomly or chaotically passing above and below the screen surface 301. This hydrodynamic oscillation extends above the screen surface 301 creating chaotically fluctuating local increases in the strain rate variables and turbulence similar to what a fish 604 may encounter in a natural waterway. These small-scale flow instabilities can be detected by fish 604, and possibly other animal life, prior to untoward physical contact with the screen surface 301 in the same way that fish 604 instinctively avoid colliding with objects in natural waterways.

Refer to FIGS. 7 and 8. The screen surface 301, instead of being characterized by efficient flow through the individual wedge wire or bar elements 303, is now characterized as a complex mosaic of fluctuating small scale turbulent features 801. If properly sized and spaced, the plates 701 may be used to control flow 703 through the screen surface 301 instead of relying on the perforation plate 302 as is done conventionally. Additionally, the plates 701 may maintain relatively constant total discharge through a screen surface 301 as total flow 703 approaching the screen surface 301 increases because the size of the hydrodynamic instability created by the plates 701 increases as the local water velocity increases. That is, as the discharge (and thereby the water velocity) increases, the size of the hydrodynamic features created by the plates 701 also increases, limiting further flow through the screen surface 301. Standard engineering practice may be used to determine optimum combinations of screen 300 deployment angle, spacing of the modified screen members 304, 305, 701 and design of the perforation plates 302 (if still used). The height, length, location, and shape of the plates 701 nominally attached to the U-clips 305 may be adjusted to create the desired hydrodynamic signatures on the screen surface 301, also using standard engineering methods.

While the present invention has been described in connection with the preferred embodiments of the various elements, it is to be understood that other similar embodiments may be used or modifications and additions may be made to the presently described embodiment for performing the same function of the present invention without deviating therefrom. Therefore, the present invention should not be limited to any single embodiment, but rather construed in breadth and scope in accordance with the recitation of the appended claims.

I claim:

1. A method that assists waterborne fauna in avoiding contact with a diversion screen having an upstream and a downstream side said, diversion screen installed in a waterway and useful to some extent for diversion of said fauna, comprising:

adding at least one feature to said downstream side said of diversion screen, in which said adding at least one feature comprises affixing rows of elements, each said element having a length, a width and a depth, said length being longer than said width and said width equal to or longer than said depth, to the downstream side of said diversion screens, wherein said elements are arranged with said length approximately perpendicular to the longest dimension of structural material used to construct said diversion screens, and wherein said feature enables simulation of at least one natural hydraulic cue of which said fauna are receptive so as to initiate an instinctive awareness in said fauna to avoid said diversion screen, and wherein the absence of said at least one feature may result in said fauna contacting said barrier at harmful velocities, and wherein said elements are affixed to said diversion screens in spacing and dimension by using standard engineering methods that may also accommodate requirements not related to simulating said natural hydraulic cue.

2. The method of claim 1 in which said elements are rectangular plates, said length of each said plates maintained approximately perpendicular to said longest dimension of said diversion screens.

3. A diversion screen installed in a waterway td generate a natural hydraulic cue that permits fauna to avoid contact with said screen, comprising:

a first series of first parallel elements each said first parallel element having a length, a width and a depth and an upstream side and a downstream side when installed, said length being longer than said width and said width equal to or longer than said depth, a series of connectors for connecting said first parallel elements, said connectors positioned between said first parallel elements to effect a planar structure with a pre-specified spacing between any two said first parallel elements, and a second series of second parallel elements affixed on said downstream side of said planar structure, each said second parallel element having a length, a width and a depth, said length being longer than equal to said width and said width longer than said depth, said second parallel elements positioned proximate said connectors, wherein said second series of second parallel elements is positioned on said downstream side of said first series of parallel elements and oriented approximately perpendicular to said length of said first series of parallel elements, and wherein said second series of second parallel elements enables said natural hydraulic cue to be simulated by said screen.

4. The diversion screen of claim 3 in which said first parallel elements comprise wire.

5. The diversion screen of claim 3 in which said first parallel elements comprise bars.

6. The diversion screen of claim 3 in which said second parallel elements comprise plates.

7. The diversion screen of claim 3 which said second parallel elements comprise rectangular plates.

8. The diversion screen of claim 3 which said connectors are U-clips.

* * * * *